US010827322B1

(12) United States Patent
Lal et al.

(10) Patent No.: US 10,827,322 B1
(45) Date of Patent: Nov. 3, 2020

(54) AUGMENTED REALITY SIGNAL VISUALIZATION

(71) Applicant: Charter Communications Operating, LLC, St. Louis, MO (US)

(72) Inventors: Dhananjay Lal, Englewood, CO (US); Christian G. Loera, Denver, CO (US)

(73) Assignee: CHARTER COMMUNICATIONS OPERATING, LLC, St. Louis, MO (US)

(*) Notice: Subject to any disclaimer, the term of this patent is extended or adjusted under 35 U.S.C. 154(b) by 0 days.

(21) Appl. No.: 16/503,771

(22) Filed: Jul. 5, 2019

(51) Int. Cl.
| | |
|---|---|
| *G06T 11/00* | (2006.01) |
| *H04W 4/20* | (2018.01) |
| *H04W 4/024* | (2018.01) |
| *H04B 17/318* | (2015.01) |
| *G06T 7/62* | (2017.01) |

(52) U.S. Cl.
CPC ............ *H04W 4/20* (2013.01); *G06T 7/62* (2017.01); *G06T 11/00* (2013.01); *H04B 17/318* (2015.01); *H04W 4/024* (2018.02)

(58) Field of Classification Search
CPC . G06T 7/62; G06T 11/00; G06T 15/08; G06T 17/20
USPC .................................................... 345/633
See application file for complete search history.

(56) References Cited

U.S. PATENT DOCUMENTS

| | | | |
|---|---|---|---|
| 9,292,951 B2 | 3/2016 | Mulé et al. | |
| 9,547,939 B2 | 1/2017 | Hittel et al. | |
| 2013/0196684 A1* | 8/2013 | Dong ................. | H04W 4/33 455/456.1 |
| 2015/0177359 A1* | 6/2015 | Marron ............... | H04W 4/029 455/456.6 |
| 2016/0295364 A1* | 10/2016 | Zakaria ............... | H04L 67/12 |
| 2017/0124396 A1* | 5/2017 | Todeschini ......... | G06K 9/00671 |
| 2017/0318519 A1 | 11/2017 | Belz et al. | |
| 2018/0102858 A1* | 4/2018 | Tiwari ............... | G06Q 10/06 |
| 2019/0287311 A1* | 9/2019 | Bhatnagar .......... | G06F 3/017 |

\* cited by examiner

*Primary Examiner* — Thomas J Lett
(74) *Attorney, Agent, or Firm* — The Marbury Law Group, PLLC (57) ABSTRACT

Embodiments include systems and methods for augmented reality signal visualization. In embodiments, processor of a wireless device may obtain a plurality of room images and generate a data structure including physical room characteristics and detected substantially horizontal surfaces in the room. The processor may determine a signal strength level at a plurality of locations of the room. The processor may present a real-time display of signal strength indicia and a live room image based on the signal strength measurements at the plurality of locations in the room.

22 Claims, 9 Drawing Sheets

AUGMENTED REALITY SIGNAL VISUALIZATION

BACKGROUND

Computing devices capable of wireless communication have become commonplace. The physical layer for modern wireless communication typically uses signals employing one or more Institute of Electrical and Electronics Engineers (IEEE) 802.11 standards, such as Wi-Fi, typically provided by a wireless access point or similar device. Alternatively, other short range wireless protocols such as Bluetooth®, Zigbee®, ad hoc networks may provide a wireless device with networked communication capabilities. A wireless device's ability to provide networked communications and services heavily depends on the wireless bandwidth accessible by the wireless device. Wireless signal strength can be affected by a variety of factors, such as distance from an access point, physical obstructions, and electromagnetic interference. However, wireless signal strength and conditions that affect wireless signal strength may not be readily apparent to a user seeking to place and connect a wireless device to a wireless network.

SUMMARY

Various embodiments include systems and methods for augmented reality visualization of wireless signal strengths. Various embodiments may include obtaining a plurality of room images, generating a data structure including physical room characteristics and one or more substantially horizontal surfaces in the room, determining one or more signal strength levels at a plurality of locations in the room, and presenting a real-time display of signal strength indicia and a live room image based on the one or more signal strength levels at the plurality of locations in the room.

Some embodiments may further include determining physical room characteristics based on the obtained plurality of room images. Some embodiments may further include performing image analysis to detect the one or more substantially horizontal surfaces in the room. In some embodiments, determining one or more signal strength levels at a plurality of locations in the room may include generating instructions to direct motion of the wireless device around the room based on the generated data structure, and determining the one or more signal strength levels at the plurality of locations in the room according to the directed wireless device motion around the room.

Some embodiments may further include presenting the generated instructions for the user. Some embodiments may further include generating the signal strength indicia, and correlating the signal strength indicia, the physical room characteristics, and the detected one or more substantially horizontal surfaces. Some embodiments may further include filtering the signal strength indicia according to one or more user preferences.

Further embodiments may include a wireless device including a memory and a processor coupled to the memory and configured with processor-executable instructions to perform operations of the methods described above. Further embodiments may include processor-readable storage media upon which are stored processor executable instructions configured to cause a controller of a wireless device to perform operations of the methods described above. Further embodiments may include a wireless device including means for performing functions of the methods described above.

BRIEF DESCRIPTION OF THE DRAWINGS

The accompanying drawings, which are incorporated herein and constitute part of this specification, illustrate exemplary embodiments, and together with the general description given above and the detailed description given below, serve to explain the features of some embodiments.

DETAILED DESCRIPTION

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of various embodiments or the claims.

The terms "component," "module," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a computing device and the computing device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known computer, processor, and/or process related communication methodologies.

A wireless device's ability to provide networked communications and services depends on wireless bandwidth accessible by the wireless device. Wireless signal strength may be affected by a variety of factors, such as distance from an access point, physical obstructions, and electromagnetic interference. However, wireless signal strength and conditions that affect wireless signal strength may not be readily apparent to a user seeking to position a wireless device in order to connect the wireless device to a wireless network.

Various embodiments include systems and methods of visualizing wireless signals using augmented reality. In some embodiments, a wireless device may be configured to receive and analyze real-time information including images or video and wireless signal strength information, and to generate a real-time display of detected signal strength levels together with a live image of a room or other space. Various embodiments include configuring the wireless device to utilize three-dimensional visualization, simultaneous location and mapping (SLAM) techniques, and real-time signal strength detection to generate and present an augmented reality visualization of wireless signal strength levels.

In some embodiments, a wireless device may receive a plurality of room images. The images may be a series of discrete images, video, or other suitable images, including combinations thereof. The wireless device may determine physical room characteristics, for example, based on the plurality of room images. The physical room characteristics may include dimensions, a volume, a shape, and other suitable characteristics. In some embodiments, the wireless device may perform image analysis to detect one or more substantially horizontal surfaces in the room. The substantially horizontal surface(s) may include a surface on furniture (such as a portion of a table, a countertop, a sofa, a chair, etc.), a surface of a structural element of a room (such as a windowsill, a built in shelf, a cutout, a protrusion, etc.), and other surfaces in the room. In some embodiments, the wireless device may detect one or more characteristics of each substantially horizontal surface, such as a shape, volume, size, and/or another characteristic of the substantially horizontal surface. In some embodiments, the wireless device may be configured to generate a data structure including the physical room characteristics and the detected surface(s). The data structure may include one or more representations of the physical room characteristics and the detected substantially horizontal surface(s).

In some embodiments, the wireless device may generate instructions to direct user movement with the wireless device around the room based on the generated data structure, for the purpose of instructing a user to move the wireless device around the room according to the instructions. The wireless device may determine one or more signal strength levels at a plurality of locations in the room according to the directed motion. In some embodiments, the wireless device may employ one or more "gamification" techniques to generate and present the instructions for user movement. The generated instructions may include a path to follow, a target indicating a destination, verbal instructions to move to an indicated location, or other suitable instructions. The generated instructions may be visual, audible, tactile (e.g., using haptic feedback), or another form of user-perceivable instructions. In some embodiments, the wireless device may correlate the signal strength levels, the physical room characteristics, and the detected one or more substantially horizontal surfaces.

In some embodiments, the wireless device may generate signal strength indicia based on the signal strength levels. The indicia may represent a signal strength level. The indicia may be presented in a variety of forms, such as a color code, an alphanumeric character, a shape, or another suitable indicator. In some embodiments, two or more signal strength indicia may be displayed as a contour map or another similar presentation.

In some embodiments, the wireless device may filter the signal strength indicia. For example, the signal strength indicia may indicate a signal strength in a location that is impractical or unusable, such as midair, in a seating area (e.g., in the middle of a sofa), in a travel area (e.g., a hallway, the middle of a rug, etc.), on a surface dedicated for another activity (e.g., a workspace, a cooktop or stove, etc.), or another such impractical location. In some embodiments, the wireless device may filter such impractical or unusable locations out of the signal strength indicia. As another example, one or more user preferences may indicate a user's preference for substantially horizontal surfaces such as desktops, tabletops, countertops, and the like. As another example, the user preferences may indicate a user's preference for a particular type of location, such as a sitting desk, a standing desk, a cocktail-height table, a countertop, and the like. In some embodiments, the wireless device may filter the signal strength indicia based on one or more user preferences.

In some embodiments, the wireless device may receive a live room image, such as from a camera or other similar device. In some embodiments, the wireless device may present an augmented reality display including the live room image together with the signal strength indicia. In some embodiments, the augmented reality display may enable a user to select a location having a minimum level of wireless signal strength at which to access wireless bandwidth with a wireless device (e.g., in a workspace, a coffee shop, or another location). In some embodiments, the augmented reality display may enable a user to position a wireless device (e.g., a wireless printer, a wireless speaker, or another wireless device) at a location having sufficient wireless signal strength for the wireless device's operation. In some embodiments, the augmented reality display may enable a user to detect locations having low signal strength, which may enable the user to identify and remediate a cause of the low signal strength.

Various embodiments improve the operation of wireless devices and wireless communication systems by providing a visualization of wireless signal strength levels using real-time image information and real-time signal strength data. Various embodiments improve the operation of wireless devices by enabling rapid and easy-to-use wireless signal strength detection and visualization. Various embodiments improve the operation of wireless devices by enabling the placement of a wireless device in a location having sufficient wireless signal strength to support the provision of wireless communications and network services to a wireless device.

Figure 1:
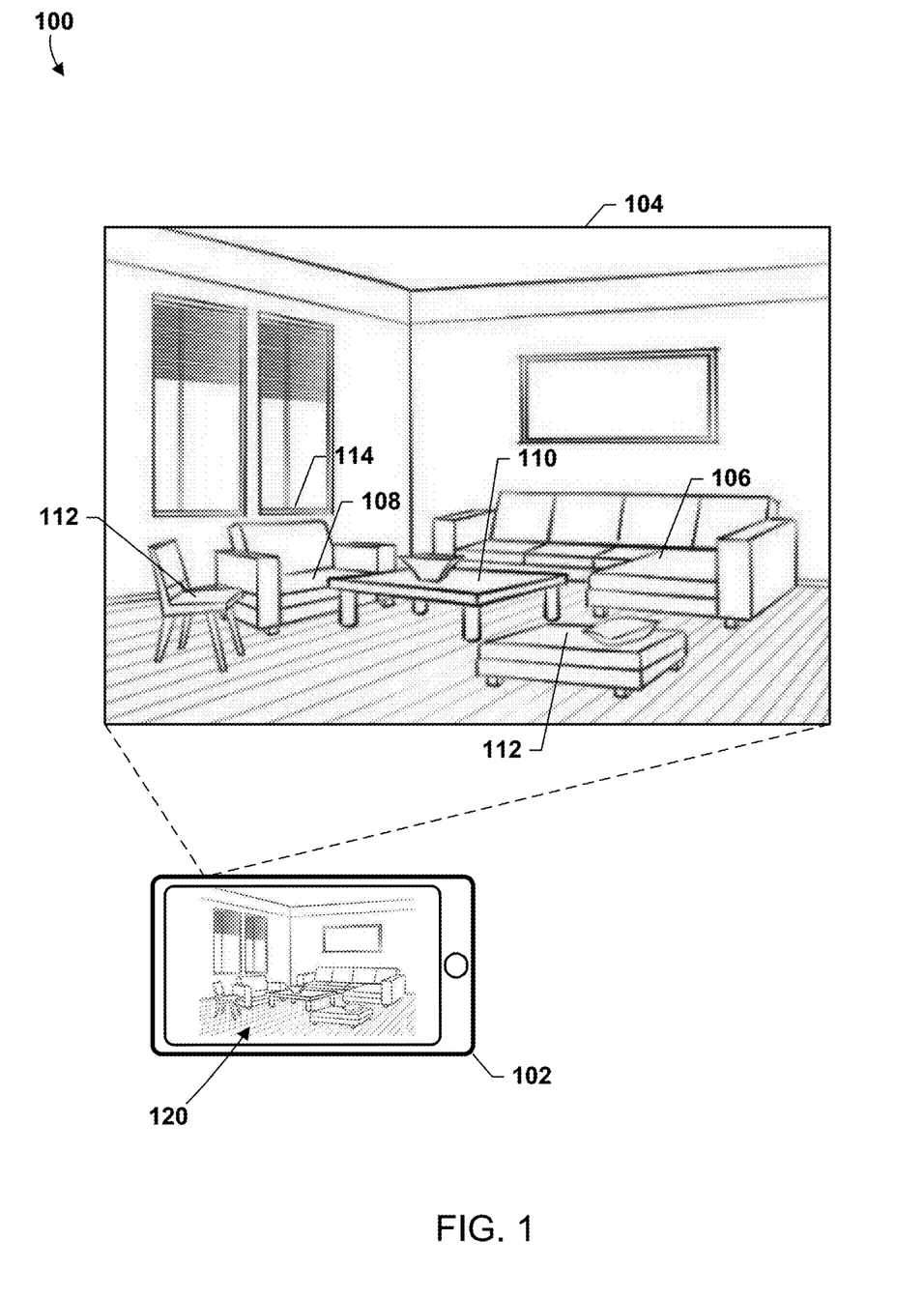
FIG. 1 is a system block diagram of an environment suitable for some embodiments.

FIG. 1 illustrates an environment 100 suitable for some embodiments. The environment 100 may include a room 104. The room 104 may include various substantially horizontal surfaces, including, for example, substantially horizontal surfaces associated with a sofa 106, chairs 108 and 112, a table 110, an ottoman 112, and a windowsill 114. The room 104 may include other aspects such as structural elements associated with the ceiling and walls, doorways, skylights, etc. (not explicitly identified for conciseness).

A wireless device 102 may obtain one or more images of the room 104, such as using a camera device or other similar optical sensor. The images may include a plurality of images, sequence of images, video, or other images. The wireless device 102 may present a display 120 of the one or more images of the room 104. In some embodiments, the wireless device 102 may include any device capable of providing an augmented reality (AR) or mixed reality (MR) presentation of information and/or images (referred to herein as "augmented reality" for conciseness). The wireless device 102 may perform operations to generate and present in augmented reality display of the room 104, as further described below.

Figure 2:
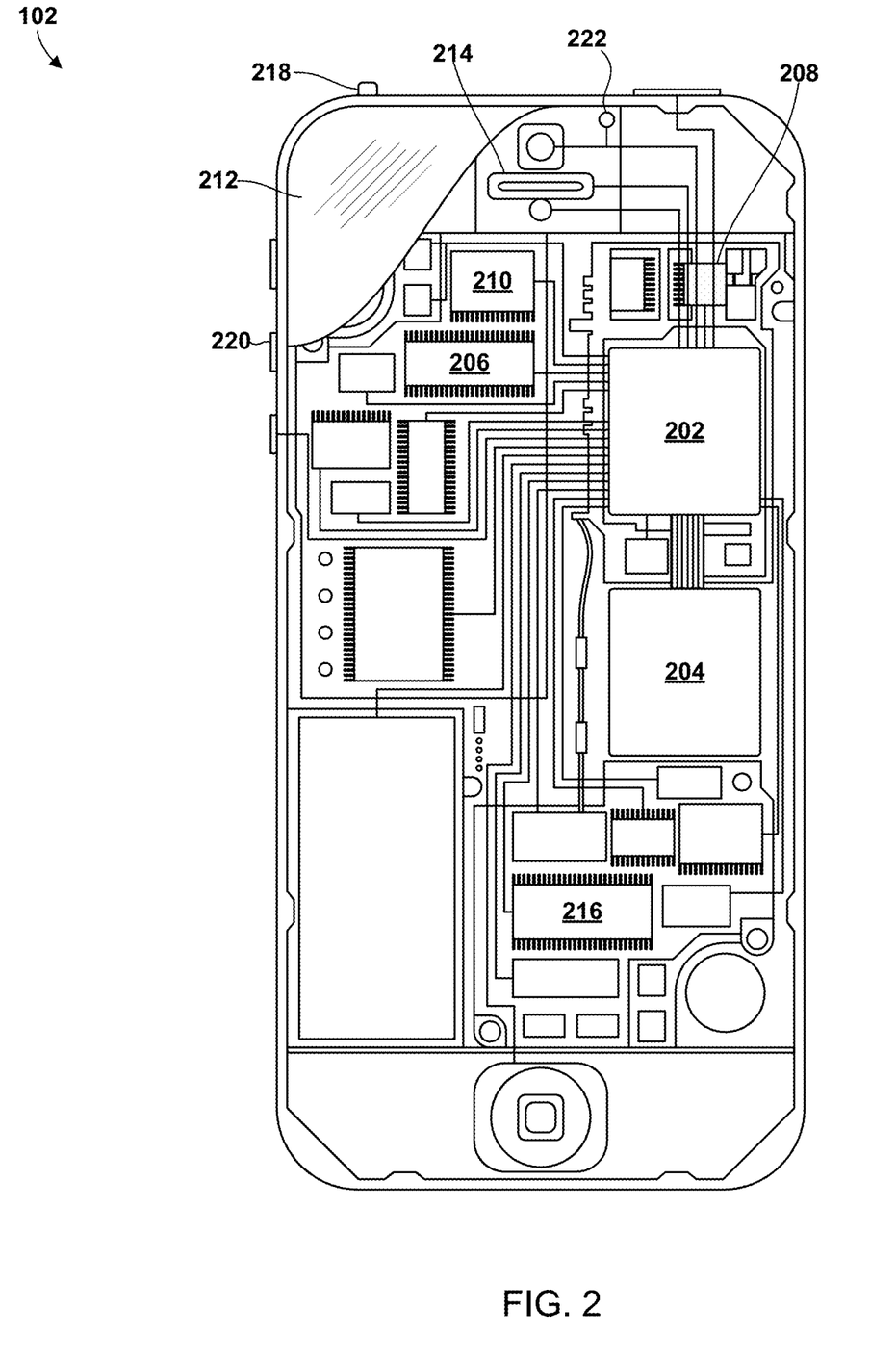
FIG. 2 is a component block diagram illustrating a wireless device according to some embodiments.

FIG. 2 is a component block diagram of an example wireless device 102 suitable for use in various embodiments. With reference to FIGS. 1 and 2, the wireless device 102 may include a first System-On-Chip (SOC) processor 202 (such as a SOC-CPU) coupled to a second SOC 204 (such as a 5G capable SOC). The first and second SOCs 202, 204 may be coupled to internal memory 206, 216, a display 212, and to a speaker 214. Additionally, the wireless device 102 may include an antenna 218 for sending and receiving electromagnetic radiation that may be connected to a wireless data link and/or wireless transceiver 208 coupled to one or more processors in the first and/or second SOCs 202, 204. The one or more processors may be configured to determine signal strength levels of signals received by the antenna 218. The wireless device 102 may also include menu selection buttons or rocker switches 220 for receiving user inputs. In addition, soft virtual buttons may be presented on display 212 for receiving user inputs.

The wireless device 102 may also include a sound encoding/decoding (CODEC) circuit 210, which digitizes sound received from a microphone into data packets suitable for wireless transmission and decodes received sound data packets to generate analog signals that are provided to the speaker to generate sound. Also, one or more of the processors in the first and second SOCs 202, 204, wireless transceiver 208 and CODEC 210 may include a digital signal processor (DSP) circuit (not shown separately). The wireless device 102 may also include one or more optical sensors 222, such as a camera. The optical sensors 222 may be coupled to one or more processors in the first and/or second SOCs 202, 204 to control operation of and to receive information from the optical sensor(s) 222 (e.g., images, video, and the like).

The processors (e.g., SOCs 202, 204) of the wireless device 102 may be any programmable microprocessor, microcomputer or multiple processor chip or chips that can be configured by software instructions (applications) to perform a variety of functions, including the functions of the various embodiments described below. In some wireless devices, multiple processors may be provided, such as one processor within an SOC 204 dedicated to wireless communication functions and one processor within an SOC 202 dedicated to running other applications. Typically, software applications including processor-executable instructions may be stored in non-transitory processor-readable storage media, such as the memory 206, 216, before the processor-executable instructions are accessed and loaded into the processor. The processors 202, 204 may include internal memory sufficient to store the application software instructions. The mobile device 102 may also include optical sensors such as a camera (not shown).

Figure 3:
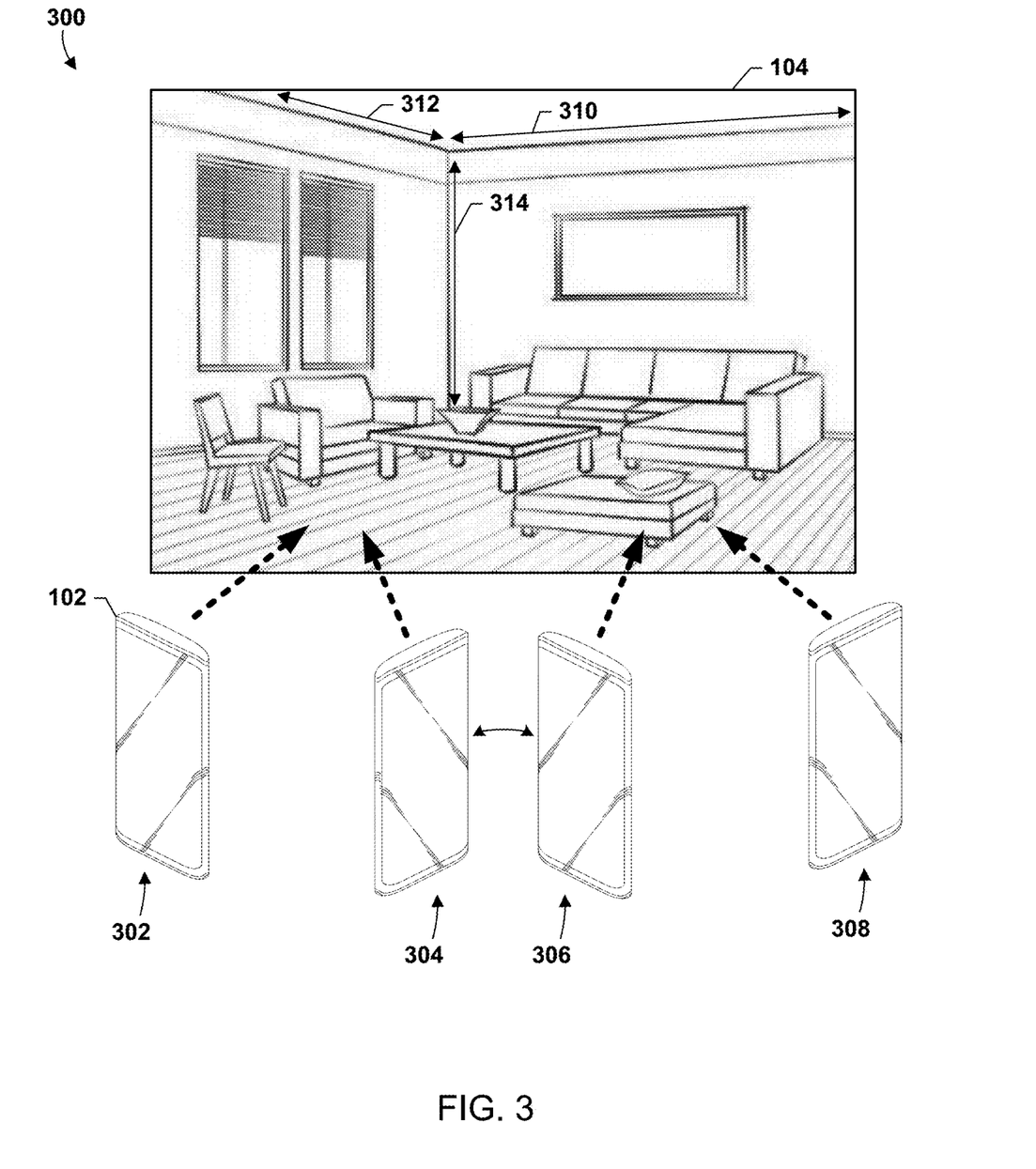
FIGS. 3-10 are diagrams illustrating methods of augmented reality visualization according to some embodiments.
Figure 4:
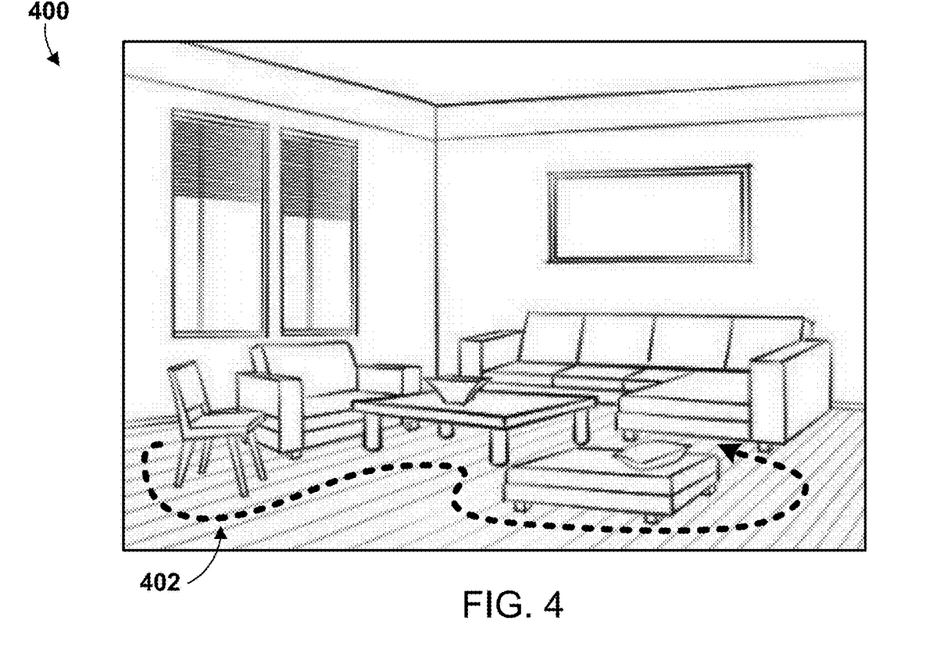
Figure 5:
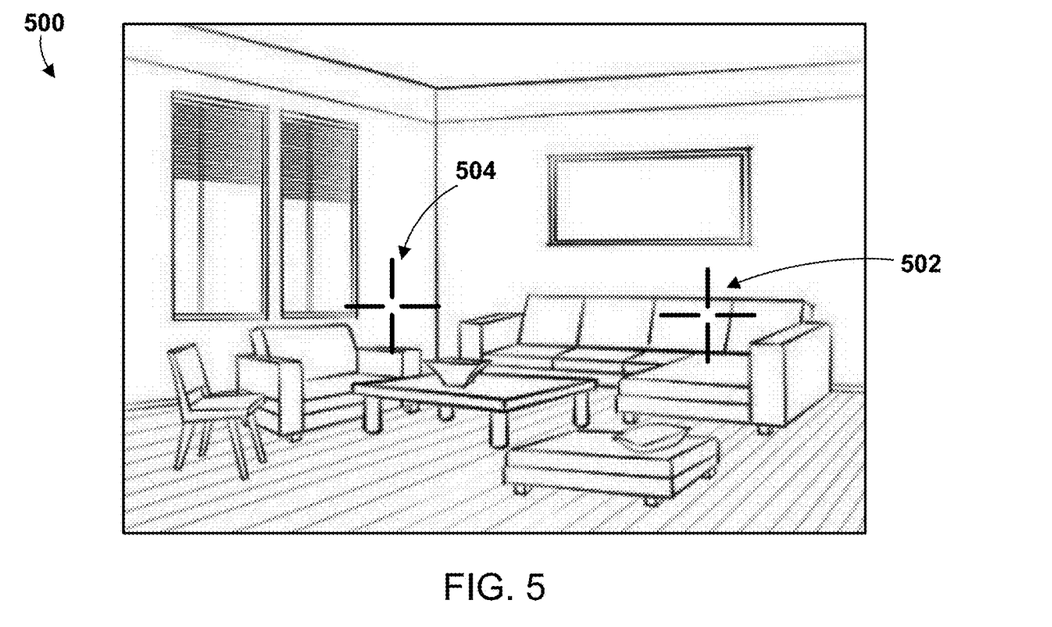
Figure 6:
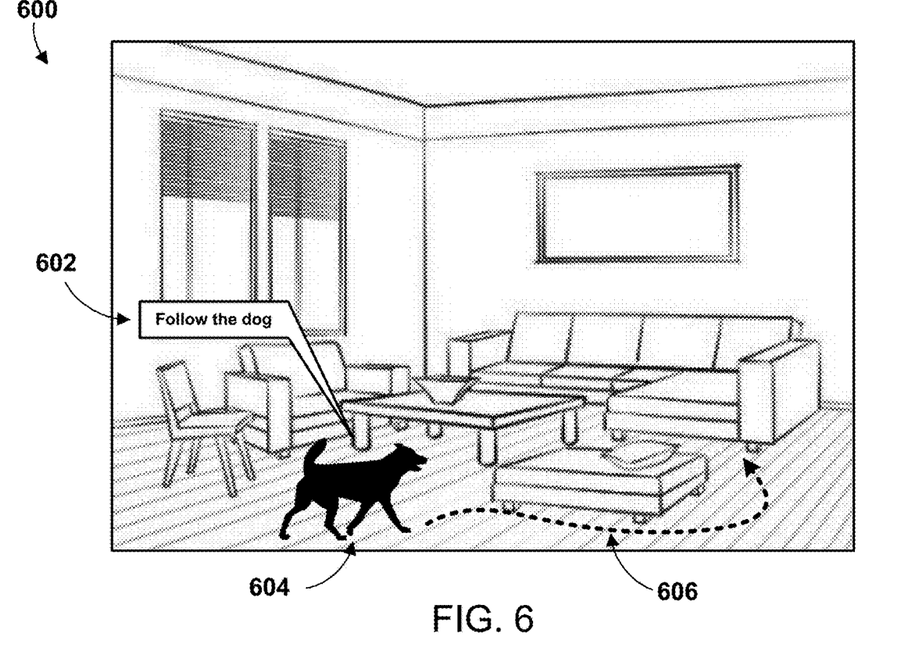
Figure 7:
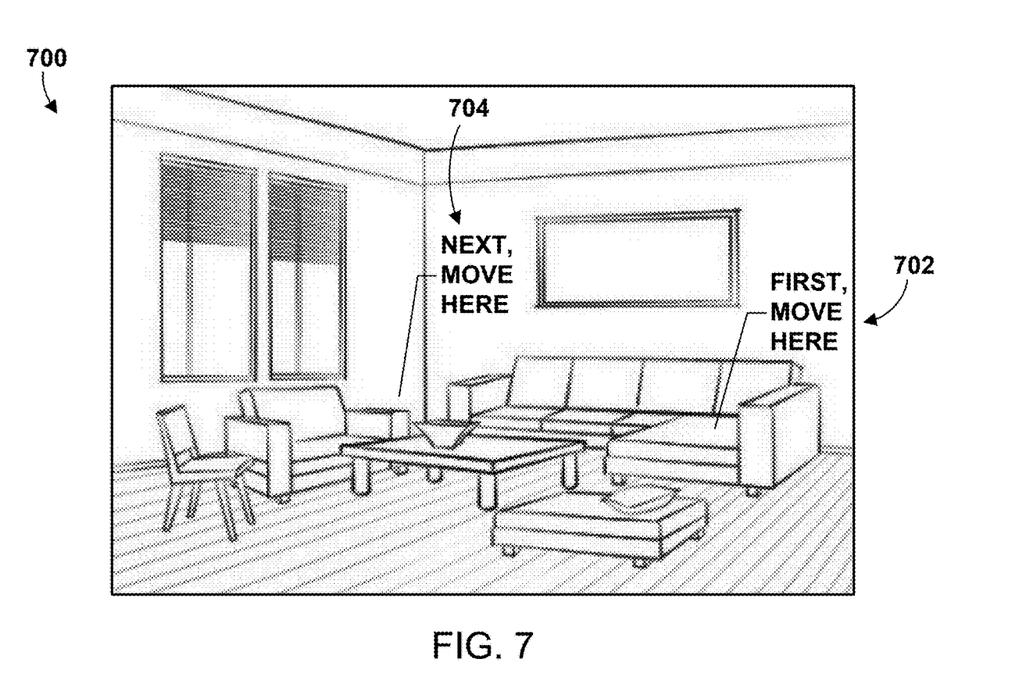

FIG. 3 is a diagram illustrating a method of augmented reality visualization according to some embodiments. With reference to FIGS. 1-3, the method 300 may be implemented by a processor (e.g., one or more of the processors in the SOCs 202, 204) of a wireless device (e.g., the wireless device 102).

In some embodiments, the processor of the wireless device 102 may obtain a plurality of images of the room 104. In some embodiments, a user may be instructed to move the wireless device 102 to capture images of the room 104 from multiple positions, such as positions 302, 304, 306 and 308. The processor 202, 204 may receive still images, video, or any combination thereof. In some embodiments, the processor 202, 204 may capture video as the wireless device 102 is moved among two or more vantage points, for example, from position 304 to position 306.

In some embodiments, the processor 202, 204 of the wireless device 102 may perform measurements to determine physical room 104 characteristics based on the plurality of images of the room 104. For example, the processor 202, 204 may determine a room length 310, a room width 312, and/or a room height 314. In some embodiments, the processor 202, 204 may determine a room shape, room volume, or other suitable room 104 characteristics. In some embodiments, the processor 202, 204 may analyze the one or more images to detect substantially horizontal surfaces in the room 104, such as the substantially horizontal surfaces 106-114. In some embodiments, the processor 202, 204 may identify or classify the detected substantially horizontal surfaces 106-114. In some embodiments, the processor 202, 204 may apply a surface detection algorithm or machine learning algorithm to identify or classify the detected substantially horizontal surfaces 106-114 (e.g., Region-Convolutional Neural Network (R-CNN), Fast R-CNN, Faster, R-CNN, You Only Look Once (YOLO), Single Shot Detector (SSD), or another suitable SURFACE detection approach). In some embodiments, the processor 202, 204 may generate a data structure that includes the physical room characteristics and the detected substantially horizontal surfaces 106-114. In some embodiments, the processor 202, 204 may employ an augmented reality framework such as ARKit or ARCore that may enable the processor 202, 204 to plot points in three-dimensional space relative to determined room 104 characteristics.

FIGS. 4-7 are diagrams illustrating methods of augmented reality visualization according to some embodiments. With reference to FIGS. 1-7, the methods 400-700 may be implemented by a processor (e.g., one or more of the processors in the SOCs 202, 204) of a wireless device (e.g., the wireless device 102).

In some embodiments, the processor 202, 204 may generate instructions to direct a user to move around the room 104 (i.e., user motion) with the wireless device 102 based on the generated data structure. In some embodiments, the processor 202, 204 may present the instructions to direct the user (and the wireless device 102) around the room 104. As the wireless device 102 is moved around the room 104, the processor 202, 204 may determine one or more signal strength levels at a plurality of locations 302, 304, 306, 308 in the room 104. In some embodiments, the processor may determine the signal strength levels based on one or more signal strength measurements of wireless signals received by the wireless device. In some embodiments, the generated instructions may include a start instruction, stop instruction, and one or more locations 302, 304, 306, 308 to which the wireless device 102 is to be moved according to the instructions.

In some embodiments, in the method 400 (FIG. 4), the processor 202, 204 of the wireless device 102 may generate a path 402 based on the generated data structure (i.e., the physical room characteristics and detected substantially horizontal surfaces 106-114 in the room 104). In some embodiments, the processor 202, 204 may present the generated path 402 on a display device 212 of the wireless device 102. As the wireless device 102 moves along the path 402, the processor 202, 204 may determine one or more signal strength levels at a plurality of locations 302, 304, 306, 308. In some embodiments, as the wireless device 102 moves along the path 402, the display of the path may change based on the perspective of the wireless device 102 on the room 104 (e.g., a camera angle of a camera device). In some embodiments, the path 402 may be presented as a path for the user to take. In some embodiments, the path 402 may be presented as a path for the user to move the wireless device 102. For example, the path 402 may be presented in three dimensions, including varying heights as well as horizontal directions, through which the user should move the wireless device 102, to ensure that the processor 202, 204 determines signal strength levels at a variety of locations.

In some embodiments, in the method 500 (FIG. 5), the processor 202, 204 of the wireless device 102 may present a graphic indication of a target location to which the user should move, such as target reticle 502, 504. In some embodiments, in response to determining that the wireless device 102 has been moved to the indicated target location, the processor 202, 204 may remove the target reticle 502 from the display 212, and the processor 202, 204 may display a second target reticle 504 at a different location within the room 104. By instructing the user to move the wireless device 102 from target location to target location, the instructions may direct motion of the wireless device 102 through the room 104. The processor 202, 204 may determine one or more signal strength levels at the indicated locations (e.g., 302, 304, 306, 308), and/or any location within the room 104 as the wireless device 102 moves from indicated location to indicated location. In some embodiments, the processor 202, 204 may generate a graphic target location at any height or location within the room 104, to direct the motion of the wireless device 102 so that the processor 202, 204 determines signal strength levels at a variety of locations.

In some embodiments, in the method 600 (FIG. 6), the processor 202, 204 of the wireless device 102 may present a character such as such as an animated character 604 (e.g., an animated dog). In some embodiments, the processor 202, 204 may present instructions, such as instruction 602, to instruct a user to perform an action such as "follow the dog." In some embodiments, the processor 202, 204 may present a character (e.g., 604), a target reticle 502, and an instruction such as "place the target on the character." The instructions may direct motion of the wireless device 102 throughout the room 104, such as along a path 606. The processor 202, 204 may determine one or more signal strength levels at any location along the path 606 as the wireless device 102 moves through the room 104. In some embodiments, the processor 202, 204 may generate the image to move to any height or location within the room 104 to direct the motion of the wireless device 102 to a variety locations, heights, and the like, so that the processor 202, 204 may determine signal strength levels at a variety room locations.

In some embodiments, in the method 700 (FIG. 7), the processor 202, 204 of the wireless device 102 may present an instruction and a location indicator, such as the instructions 702 and 704. The instructions may direct motion of the wireless device 102 in the room 104, to a variety of locations, heights, and the like. The processor 202, 204 may determine one or more signal strength levels at any location in the room 104 as the wireless device 102 moves in the room 104.

The examples illustrated in FIGS. 4-7 are merely exemplary, and other examples of methods of augmented reality visualization according to some embodiments may also be possible. Elements of the methods 400-700 may also be combined in any combination.

In some embodiments, the processor 202, 204 may employ one or more "gamification" techniques to generate and present the instructions illustrated in FIGS. 4-7 for instructing the motion of the wireless device 102 around the room 104. For example, the generated instructions may be presented in the form of a game or contest, including goals, milestones, achievements, and the like, to be performed by the user. In some embodiments, the generated instructions may include game-like encouragement, such as awarding points for completion or near completion of achievements, or presenting graphical, audio, tactile, etc. notifications of nearly-completed or completed achievements, or other similar game-like elements. For example, the processor 202, 204 may indicate a minimum number of locations (e.g., 302, 304, 306, 308) which the wireless device 102 may reach within the room 104. As another example, the processor 202, 204 may provide a timer or stopwatch indicating a time limit by which a goal or achievement may be completed. As another example, the processor 202, 204 may provide a "score" each time the wireless device 102 arrives at an indicated location (302, 304, 306, 308), as well as a minimum required score. Other examples of game-like encouragement or instructions are also possible to instruct the motion of the wireless device 102 around the room 104.

Figure 8:
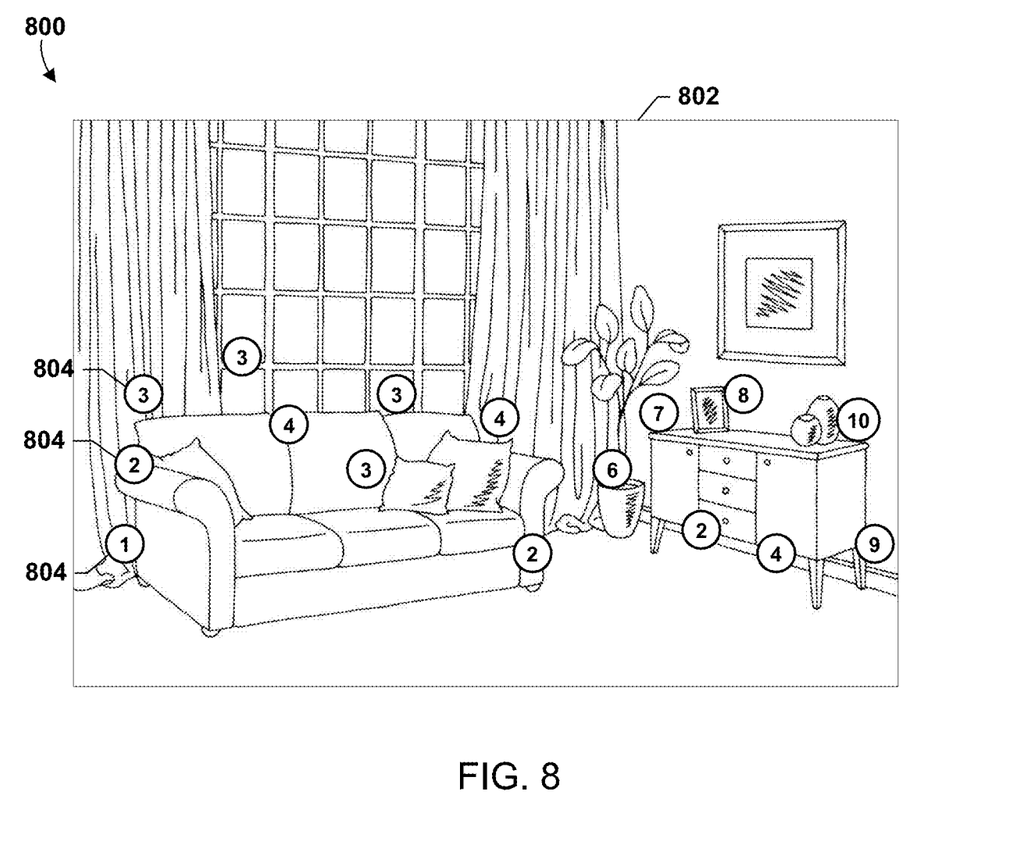
Figure 9:
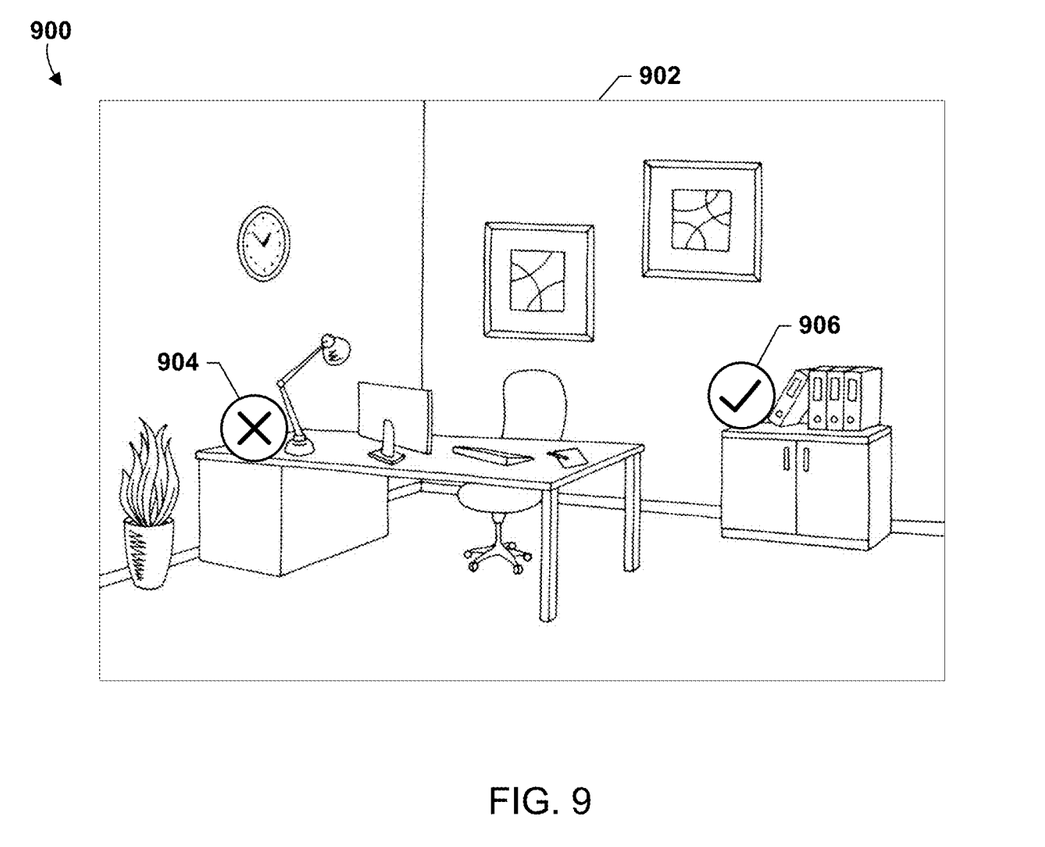
Figure 10:
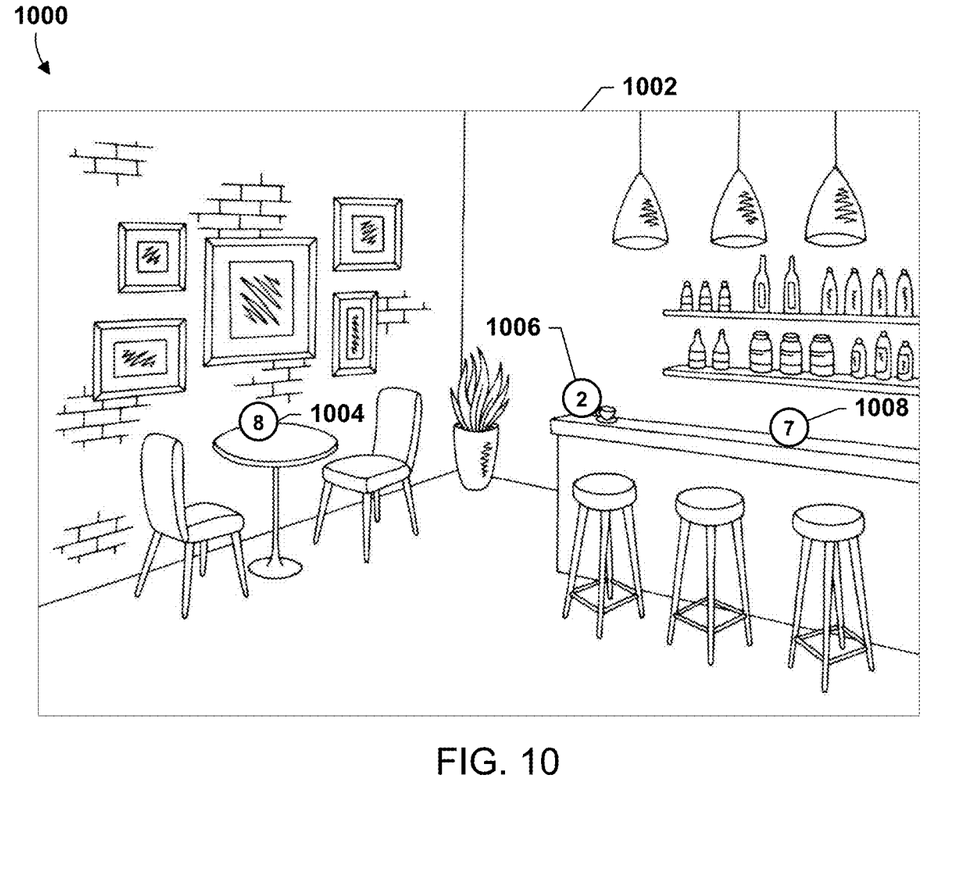

FIGS. 8-10 are diagrams illustrating methods of augmented reality visualization according to some embodiments. With reference to FIGS. 1-10, the methods 800-1000 may be implemented by a processor (e.g., one or more of the processors in the SOCs 202, 204) of a wireless device (e.g., the wireless device 102).

In the method 800 (FIG. 8), the processor may present a real-time display of a room 802 (e.g., a living room) and one or more signal strength indicia 804. The real-time display of the room 802 and the one or more signal strength indicia 804 may augment the perception of the room 802 with signal strengths levels determined by the processor 202, 204, for example, in the operations of the methods 400-700, as described.

The real-time display of the room 802 may be based on one or more images of the room obtained by a camera or similar optical sensor of the wireless device 102. In some embodiments, the processor may present the signal strength indicia 804 as a numerical indication of signal strength (e.g., 1 indicating a lowest signal strength, 10 indicating a highest signal strength, and so forth). In some embodiments, the processor 202, 204 may present the signal strength indicia superimposed on or three-dimensionally within the display of the room 802. In some embodiments, as the wireless device 102 is moved throughout the room 802, or as the wireless device 102 is turned to point the wireless device's 102 optical sensor at a different portion or location of the room 802, the processor 202, 204 may change the display of the room 802 to reflect the new image data received by the processor from the wireless device's optical sensor. The processor 202, 204 may also change the display of the room 802 to show different signal strength indicia 804 based on the new image data being displayed. In various embodiments, the processor may present the signal strength indicia 804 using different colors, different sizes, different shapes, different alphanumeric characters, and other variations. In some embodiments, the processor may present the signal strength indicia 804 graphically, such as the display of a contour map or similar illustration of a variation in the measured signals strengths within the room 802.

In the method 900 (FIG. 9), the processor 202, 204 of the wireless device 102 may present a real-time display of a room 902 (e.g., an office) and one or more signal strength indicia 904, 906. The real-time display of the room 902 and the one or more signal strength indicia 904, 906 may augment the perception of the room 902 with signal strengths levels determined by the processor, for example, in the operations of the methods 400-700, as described.

In some embodiments, the signal strength indicia 904, 906 may present a simpler version of the signal strength indicia, such as whether a signal strength detected by the processor at a location within the room 902 is below a threshold (e.g., illustrated with the "X" 904) or above the threshold (e.g., illustrated with the checkmark 906), for example, indicating whether acceptable access to wireless bandwidth may be received at the identified location of each signal strength indicia 904, 906. In some embodiments, the processor 202, 204 may present the signal strength indicia superimposed on or three-dimensionally within the display of the room 902. In some embodiments, as the wireless device 102 is moved throughout the room 902, or is turned to point the wireless device's 102 optical sensor at a different portion or location of the room 902, the processor 202, 204 may change the display of the room 902 to reflect the new image data received by the processor from the wireless device's optical sensor. In various embodiments, the processor may present the signal strength indicia 904, 906 using different colors, sizes, shapes, arrows, and the like.

In some embodiments, the signal strength indicia may also indicate a suggested location for placement of a wireless device 102. For example, the checkmark 906 may indicate a suggested location for placement of a wireless device 102. As another example, the X mark 904 may indicate a location that is not suggested for placement of a wireless device 102. The location suggestions may be based on a determined wireless signal strength level at each location. In some embodiments, each location suggestion may be based on a determination that the wireless signal strength level at that location exceeds (or is below) a signal strength threshold at such location.

In the method 1000 (FIG. 10), the processor 202, 204 of the wireless device 102 may present a real-time display of a room 1002 (e.g., a coffee shop) and one or more signal strength indicia 1004, 1006, 1008. The real-time display of the room 1002 and the one or more signal strength indicia 1004, 1006, 1008 may augment the perception of the room 1002 with signal strengths measurements performed by the processor 202, 204, for example, in the operations of the methods 400-1000, as described.

In some embodiments, the signal strength indicia 1004, 1006, 1008 may provide a graphical indication of one or more signal strength levels determined by the processor 202, 204. In some embodiments, the processor 202, 204 may present the signal strength indicia superimposed on or three-dimensionally within the display of the room 1002. In some embodiments, as the wireless device 102 is moved throughout the room 1002, or is turned to point the wireless device's 102 optical sensor at a different portion or location of the room 1002, the processor 202, 204 may change the display of the room 1002 to reflect the new image data received by the processor from the wireless device's 102 optical sensor. In various embodiments, the processor may present the signal strength indicia 1004, 1006, 1008 using different colors, sizes, shapes, and the like. The types and variations of signal strength indicia 804, 904, 906, 1004, 1006, and 1008 may be used in any combination. Other examples of suitable signal strength indicia are also possible.

In some embodiments, the signal strength indicia may also indicate a suggested location for placement of a wireless device 102. For example, the arrow 1004, 1006, and 1008 may indicate possible acceptable locations for placement of a wireless device 102. The suggested location may be based on a determined wireless signal strength level at the location. In some embodiments, the suggested location may be based on a determination that the wireless signal strength at that location exceeds a signal strength threshold.

Figure 11:
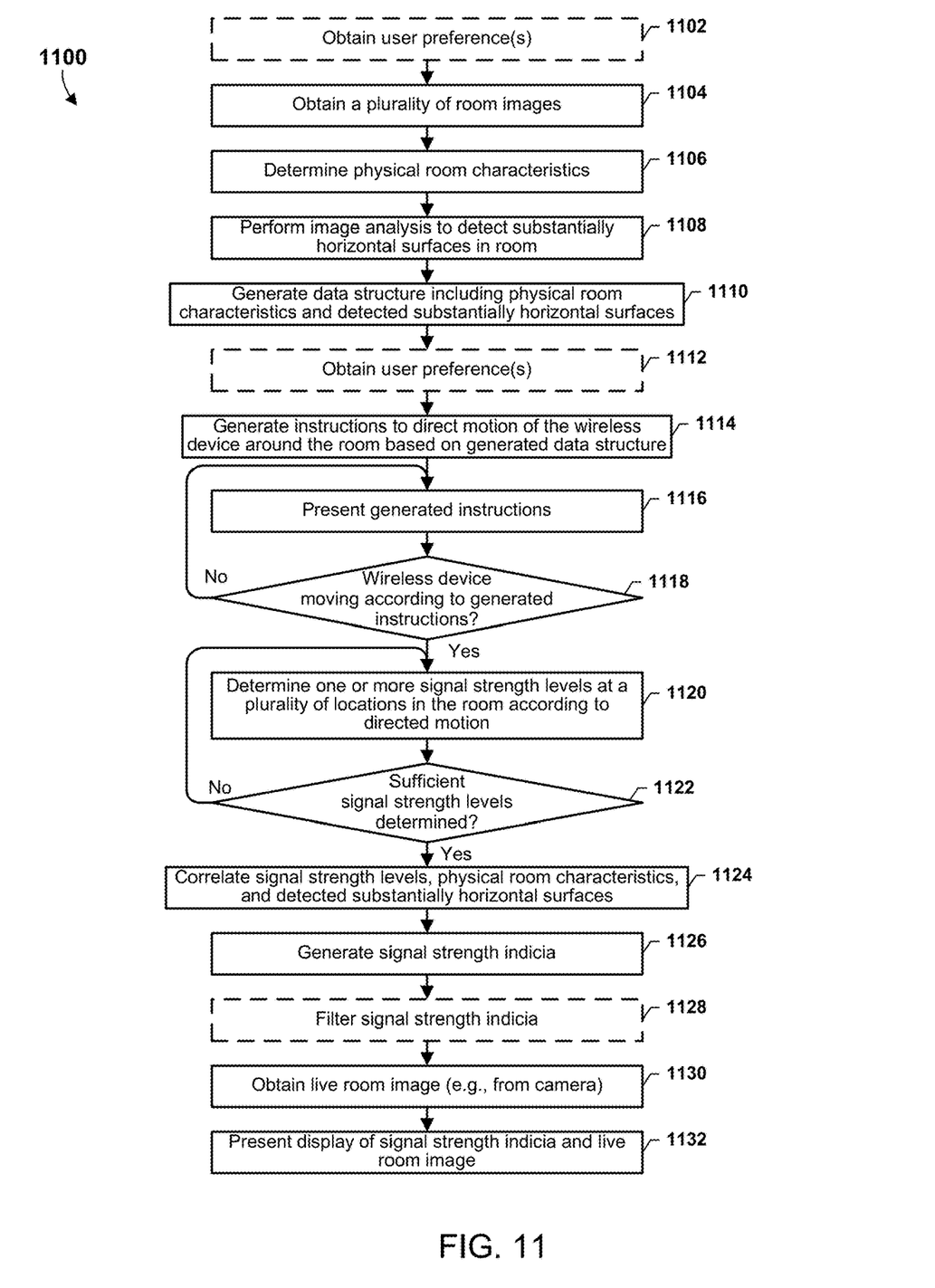
FIG. 11 is a process flow diagram illustrating a method of augmented reality visualization according to some embodiments.

FIG. 11 is a process flow diagram illustrating a method 1100 for augmented reality signal visualization according to some embodiments. With reference to FIGS. 1-11, the method 1100 may be implemented by a processor (e.g., one or more of the processors in the SOCs 202, 204) of a wireless device (e.g., the wireless device 102).

In optional block 1102, the processor 202, 204 of the wireless device 102 may obtain one or more user preferences. Typically, the processor may obtain user preferences via a user interface on the wireless device, or in some embodiments downloaded from a user preference file. In some embodiments, the user preferences may include one or more preferences for a location of a wireless device 102. For example, a user preference may indicate a type of wireless device (e.g., a laptop, a Wi-Fi router, a wireless printer, a smart phone, a tablet computer, or another suitable wireless device). In some embodiments, the user preference may provide a factor for consideration by the processor 202, 204 of the wireless device 102 to suggest a location for placement of the wireless device 102. In some embodiments, the processor 202, 204 may assign a different weight to different locations depending on the type of wireless device, based on the typical usage of that type of wireless device 102. For example, a laptop or tablet computer is typically used at a desktop, countertop, in a chair or sofa, etc., while a wireless printer or Wi-Fi router is typically placed along a wall of a room, under or behind furniture, or another typically out-of-the-way or unobtrusive location.

In some embodiments, a user preference may indicate a preference for a surface type, such as a desktop or countertop. In some embodiments, a user preference may indicate a preference for a surface height, such as desk height, standing desk height, bar top height, countertop height, and the like. In some embodiments, a user preference may indicate a preference for a type of seating, such as a sofa, chair, and the like. In some embodiments, a user preference may indicate a preferences for a characteristic of a surface, such as a shape, volume, size, etc.

In block 1104, the processor 202, 204 of the wireless device 102 may obtain a plurality of room images. In some embodiments, the processor 202, 204 may obtain the plurality of images from an optical sensor of the wireless device 102 such as a camera or another suitable optical sensor. In some embodiments, the plurality of images may include still images, video, or a combination thereof.

In block 1106, the processor 202, 204 of the wireless device 102 may determine physical room characteristics. The physical room characteristics may include dimensions (e.g., a length, a width, a height, etc.), a volume, a shape, and other suitable characteristics. In some embodiments, the processor may determine the physical room characteristics based on the plurality of room images.

In block 1108, the processor 202, 204 of the wireless device 102 may perform image analysis to detect one or more substantially horizontal surfaces in the room. The substantially horizontal surface(s) may include a surface on furniture (such as a portion of a table, a countertop, a sofa, a chair, etc.), a surface of a structural element of a room (such as a windowsill, a built in shelf, a cutout, a protrusion, etc.), and other surfaces in the room. In some embodiments, detecting the one or more substantially horizontal surfaces may include determining one or more characteristics of the surface, such as its shape, volume, size, and/or another characteristic of the surface. The wireless device 102 may be configured to generate a data structure including the physical room characteristics and the detected substantially horizontal surface(s). The data structure may include one or more representations of the physical room characteristics and the detected substantially horizontal surface(s). In some embodiments, the processor may employ one or more SLAM techniques to perform surface detection. In some embodiments, the processor 202, 204 may utilize an surface detection algorithm or a machine learning algorithm to detect, identify, and/or classify substantially horizontal surface(s).

In block 1110, the processor 202, 204 of the wireless device 102 may generate a data structure that includes the determined physical room characteristics and detected substantially horizontal surface(s). In some embodiments, the data structure may include one or more characteristics of each detected surface. In some embodiments, the data structure may include a table, database, or another suitable data structure that includes information indicative of or representing the determined physical room characteristics and detected substantially horizontal surface(s).

In optional block 1112, the processor 202, 204 of the wireless device 102 may obtain one or more user preferences. In some embodiments, the processor 202, 204 of the wireless device 102 may perform the operations of block 1112 in addition to, or alternative to, performing the operations of block 1102. In some embodiments, the processor 202, 204 may present to user (e.g., on a display of the wireless device) a live image of the room, an indication of one or more detected substantially horizontal surface(s) in the room, and/or one or more determined physical room characteristics. In some embodiments, the processor 202, 204 may receive user preference indicating, for example, a desired or preferred location for placement of a wireless device 102. For example, the processor 202, 204 may receive an input (e.g., a touch input on a touchscreen display device) indicating a seating choice, desktop or counter location, or another similar location for placement of the wireless device 102. As another example, the processor 202, 204 may receive an input indicating a location that is not preferred or desired for placement of the wireless device 102.

In block 1114, the processor 202, 204 of the wireless device 102 may generate instructions to direct motion of the wireless device 102 around the room based on the generated data structure. In some embodiments, the processor 202, 204 may generate the instructions based on the physical room characteristics. In some embodiments, the processor 202, 204 may generate the instructions based on the detected substantially horizontal surface(s) (e.g., based on an identification of a detected substantially horizontal surface, its shape, volume, size, and/or another characteristic of a detected substantially horizontal surface). In some embodiments, the processor 202, 204 may generate the instructions based on one or more user preferences.

In block 1116, the processor 202, 204 of the wireless device 102 may present the generated instructions. In various embodiments, the generated instructions may be visual, audible, tactile (e.g., using haptic feedback), or another form of user-perceivable instructions. In some embodiments, the processor 202, 204 may present the generated instructions as described with respect to the methods 400, 500, 600, and 700.

In determination block 1118, the processor 202, 204 of the wireless device 102 may determine whether the wireless device 102 is moving according to the generated instructions. For example, the processor 202, 204 may receive information from one or more sensors or devices of the wireless device 102, such as an accelerometer, an inertial measurement unit, a Global Positioning Satellite device, or another similar sensor or device that may provide information to the processor 202, 204 enabling the processor to determine location of the wireless device 102. Based on such information, the processor 202, 204 may determine whether the wireless device 102 is moving according to the generated instructions.

In response to determining that the wireless device 102 is not moving according to generate instructions (i.e., determination block 1118="No"), the processor 202, 204 may continue to present the generated instructions in block 1116. In some embodiments, the processor 202, 204 may alter the instructions to provide a notification, an indication, game-like encouragement, or another stimulus to elicit the user to move the wireless device 102 according to the generated instructions.

In response to determining that the wireless device 102 is moving according to generate instructions (i.e., determination block 1118="Yes"), the processor 202, 204 may determine one or more signal strength levels at a plurality of locations in the room according to the directed motion in block 1120.

In determination block 1122, the processor 202, 204 of the wireless device 102 may determine whether sufficient signal strength levels have been determined. In some embodiments, the processor 202, 204 may determine whether a minimum number of signal strength levels have been determined. In some embodiments, the processor 202, 204 may determine the minimum number of signal strength measurements based on the determined physical room characteristics, one or more aspects of detected substantially horizontal surface(s) in the room, and/or one or more user preferences.

In response to determining that sufficient signal strength levels have not been determined (i.e., determination block 1122="No"), the processor 202, 204 may continue to determine signal strength levels in block 1120 as described.

In response to determining that sufficient signal strength levels have been determined (i.e., determination block 1122="Yes"), the processor 202, 204 may correlate the signal strength measurements, the physical room characteristics, and the detected substantially horizontal surface(s) in block 1124.

In block 1126, the processor 202, 204 of the wireless device 102 may generate one or more signal strength indicia (e.g., as described with respect to the methods 800, 900, and 1000).

In optional block 1128, the processor 202, 204 of the wireless device 102 may filter the signal strength indicia. For example, the generated signal strength indicia may include indicia for locations that are unusable or impractical, such as suspended air points, locations too close to an object (e.g., a wall, furniture, etc.), a location in the middle of a floor, and the like. In some embodiments, the processor 202, 204 may filter such unusable or impractical indicia out of the generated signal strength indicia. As another example, the processor 202, 204 may filter the generated signal strength indicia based on one or more user preferences. For example, a user preference may indicate a seating preference or a location preference, and the processor 202, 204 may filter out signal strength indicia that do not meet the user preference.

In block 1130, the processor 202, 204 of the wireless device 102 may obtain a live room image. For example, the processor 202, 204 may obtain from an optical sensor of the wireless device a still image, video, or another live room image, including combinations thereof.

In block 1132, processor 202, 204 of the wireless device 102 may present a display of the signal strength indicia and the live room image (e.g., as described with respect to the methods 800, 900, and 1000).

Various embodiments provide a visualization of wireless signal strength levels using real-time image information and real-time signal strength data. Further, various embodiments enable rapid and easy-to-use wireless signal strength detection and visualization.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations of the methods 400, 500, 600, 700, 800, 900, 1000, and 1100 may be substituted for or combined with one or more operations of the methods 400, 500, 600, 700, 800, 900, 1000, and 1100.

Various embodiments may be implemented in any number of single or multi-processor systems. Generally, processes are executed on a processor in short time slices so that it appears that multiple processes are running simultaneously on a single processor. When a process is removed from a processor at the end of a time slice, information pertaining to the current operating state of the process may be stored in memory so the process may seamlessly resume its operations when it returns to execution on the processor. This operation state data may include the process's address space, stack space, virtual address space, register set image (e.g., program counter, stack pointer, instruction register, program status word, etc.), accounting information, permissions, access restrictions, and state information.

A process may spawn other processes, and the spawned process (i.e., a child process) may inherit some of the permissions and access restrictions (i.e., context) of the spawning process (i.e., the parent process). A process may be a heavyweight process that includes multiple lightweight processes or threads, which are processes that share all or portions of their context (e.g., address space, stack, permissions, and/or access restrictions, etc.) with other processes/threads. Thus, a single process may include multiple lightweight processes or threads that share, have access to, and/or operate within a single context (i.e., the processor's context).

The foregoing method descriptions and the process flow diagrams are provided merely as illustrative examples and are not intended to require or imply that the blocks of various embodiments must be performed in the order presented. As will be appreciated by one of skill in the art the order of blocks in the foregoing embodiments may be performed in any order. Words such as "thereafter," "then," "next," etc. are not intended to limit the order of the blocks; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm blocks described in connection with the embodiments disclosed herein may be implemented as electronic hardware, computer software, or combinations of both. To clearly illustrate this interchangeability of hardware and software, various illustrative components, blocks, modules, circuits, and blocks have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the embodiments disclosed herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of communication devices, e.g., a combination of a DSP and a microprocessor, a plurality of microprocessors, one or more microprocessors in conjunction with a DSP core, or any other such configuration. Alternatively, some blocks or methods may be performed by circuitry that is specific to a given function.

In various embodiments, the functions described may be implemented in hardware, software, firmware, or any combination thereof. If implemented in software, the functions may be stored as one or more instructions or code on a non-transitory computer-readable medium or non-transitory processor-readable medium. The operations of a method or algorithm disclosed herein may be embodied in a processor-executable software module, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present embodiments. Various modifications to these embodiments will be readily apparent to those skilled in the art, and the generic principles defined herein may be applied to other embodiments without departing from the spirit or scope of the embodiments. Thus, various embodiments are not intended to be limited to the embodiments shown herein but are to be accorded the widest scope consistent with the following claims and the principles and novel features disclosed herein.

What is claimed is:

1. A method of augmented reality signal visualization, comprising:

obtaining, by a wireless device processor, a plurality of room images;

generating, by the processor, a data structure including physical room characteristics and one or more substantially horizontal surfaces in the room;

determining, by the processor, one or more signal strength levels of signals received by an antenna of the wireless device at a plurality of locations in the room;

generating, by the processor, signal strength indicia based on the determined one or more signal strength levels;

correlating, by the processor, the signal strength indicia and the one or more substantially horizontal surfaces in the room; and presenting, by the processor, a real-time display of signal strength indicia and a live room image based on the correlation of the signal strength indicia and the one or more substantially horizontal surfaces in the room.

2. The method of claim 1, further comprising:

determining, by the processor, physical room characteristics based on the obtained plurality of room images.

3. The method of claim 1, further comprising:

performing, by the processor, image analysis to detect the one or more substantially horizontal surfaces in the room.

4. The method of claim 1, wherein determining one or more signal strength levels at a plurality of locations in the room comprises:

generating, by the processor, instructions to direct motion of the wireless device around the room based on the generated data structure; and determining, by the processor, the one or more signal strength levels at the plurality of locations in the room according to the directed wireless device motion around the room.

5. The method of claim 4, further comprising:

presenting, by the processor, the generated instructions for the user.

6. The method of claim 1, wherein correlating, by the processor, the signal strength indicia and the one or more substantially horizontal surfaces in the room comprises correlating, by the processor, the signal strength indicia, the physical room characteristics, and the detected one or more substantially horizontal surfaces.

7. The method of claim 1, further comprising:

filtering, by the processor, the signal strength indicia according to one or more user preferences.

8. A wireless device, comprising:

a memory; and a processor, coupled to the memory, and configured with processor-executable instructions to perform operations comprising:

obtaining a plurality of room images;

generating a data structure including physical room characteristics and one or more substantially horizontal surfaces in the room;

determining one or more signal strength levels of signals received by an antenna of the wireless device at a plurality of locations in the room;

generating signal strength indicia based on the determined one or more signal strength levels;

correlating the signal strength indicia and the one or more substantially horizontal surfaces in the room; and presenting a real-time display of signal strength indicia and a live room image based on the correlation of the signal strength indicia and the one or more substantially horizontal surfaces in the room.

9. The wireless device of claim 8, wherein the processor is configured with processor-executable instructions to perform operations further comprising:

determining physical room characteristics based on the obtained plurality of room images.

10. The wireless device of claim 8, wherein the processor is configured with processor-executable instructions to perform operations further comprising:

performing image analysis to detect the one or more substantially horizontal surfaces in the room.

11. The wireless device of claim 8, wherein the processor is configured with processor-executable instructions to perform operations such that determining one or more signal strength levels at a plurality of locations in the room comprises:

generating instructions to direct motion of the wireless device around the room based on the generated data structure; and determining the one or more signal strength levels at the plurality of locations in the room according to the directed wireless device motion around the room.

12. The wireless device of claim 11, wherein the processor is configured with processor-executable instructions to perform operations further comprising:

presenting the generated instructions for the user.

13. The wireless device of claim 8, wherein the processor is configured with processor-executable instructions to perform operations such that correlating the signal strength indicia and the one or more substantially horizontal surfaces in the room comprises correlating the signal strength indicia, the physical room characteristics, and the detected one or more substantially horizontal surfaces.

14. The wireless device of claim 8, wherein the processor is configured with processor-executable instructions to perform operations further comprising:

filtering the signal strength indicia according to one or more user preferences.

15. A wireless device, comprising:

means for obtaining a plurality of room images;

means for generating a data structure including physical room characteristics and one or more substantially horizontal surfaces in the room;

means for determining one or more signal strength levels of signals received by an antenna of the wireless device at a plurality of locations in the room;

means for generating signal strength indicia based on the determined one or more signal strength levels;

means for correlating the signal strength indicia and the one or more substantially horizontal surfaces in the room; and means for presenting a real-time display of signal strength indicia and a live room image based on the correlation of the signal strength indicia and the one or more substantially horizontal surfaces in the room.

16. A non-transitory processor-readable storage medium having stored thereon processor-executable instructions configured to cause a processor of a wireless device to perform operations, comprising:

obtaining a plurality of room images;

generating a data structure including physical room characteristics and one or more substantially horizontal surfaces in the room;

determining one or more signal strength levels of signals received by an antenna of the wireless device at a plurality of locations in the room;

generating signal strength indicia based on the determined one or more signal strength levels;

correlating the signal strength indicia and the one or more substantially horizontal surfaces in the room; and presenting a real-time display of signal strength indicia and a live room image based on the correlation of the signal strength indicia and the one or more substantially horizontal surfaces in the room.

17. The non-transitory processor-readable storage medium of claim 16, wherein the stored processor-executable instructions are configured to cause the processor of the wireless device to perform operations further comprising:

determining physical room characteristics based on the obtained plurality of room images.

18. The non-transitory processor-readable storage medium of claim 16, wherein the stored processor-executable instructions are configured to cause the processor of the wireless device to perform operations further comprising:

performing image analysis to detect the one or more substantially horizontal surfaces in the room.

19. The non-transitory processor-readable storage medium of claim 16, wherein the stored processor-executable instructions are configured to cause the processor of the wireless device to perform operations such that determining one or more signal strength levels at a plurality of locations in the room comprises:

generating instructions to direct motion of the wireless device around the room based on the generated data structure; and determining the one or more signal strength levels at the plurality of locations in the room according to the directed wireless device motion around the room.

20. The non-transitory processor-readable storage medium of claim 19, wherein the stored processor-executable instructions are configured to cause the processor of the wireless device to perform operations further comprising:

presenting the generated instructions for the user.

21. The non-transitory processor-readable storage medium of claim 16, wherein the stored processor-executable instructions are configured to cause the processor of the wireless device to perform operations such that correlating the signal strength indicia and the one or more substantially horizontal surfaces in the room comprises correlating the signal strength indicia, the physical room characteristics, and the detected one or more substantially horizontal surfaces.

22. The non-transitory processor-readable storage medium of claim 16, wherein the stored processor-executable instructions are configured to cause the processor of the wireless device to perform operations further comprising:

filtering the signal strength indicia according to one or more user preferences.

\* \* \* \* \*